(12) United States Patent
Bone et al.

(10) Patent No.: US 7,497,017 B2
(45) Date of Patent: Mar. 3, 2009

(54) DEBRIS REMOVAL APPARATUS FOR A JIGSAW

(75) Inventors: Graham Bone, Carrville (GB); Susie Turner, Isle of Dogs (GB)

(73) Assignee: Black & Decker Inc., Newark, DE (US)

( * ) Notice: Subject to any disclaimer, the term of this patent is extended or adjusted under 35 U.S.C. 154(b) by 209 days.

(21) Appl. No.: 11/475,332

(22) Filed: Jun. 27, 2006

(65) Prior Publication Data

US 2007/0214659 A1  Sep. 20, 2007

(30) Foreign Application Priority Data

Mar. 18, 2006 (EP) .................................. 06251458

(51) Int. Cl.
*B23D 59/00* (2006.01)
*B23D 49/16* (2006.01)

(52) U.S. Cl. .......................................... 30/392; 30/124

(58) Field of Classification Search ................ 30/123.3, 30/124, 376, 392; D8/64; 144/252.1
See application file for complete search history.

(56) References Cited

U.S. PATENT DOCUMENTS

| D191,570 | S | * | 10/1961 | Downs ........................... D8/64 |
| 3,938,251 | A | * | 2/1976 | Kareman ....................... 30/376 |
| 4,090,297 | A | * | 5/1978 | Wanner et al. ................. 30/124 |
| 4,665,617 | A | * | 5/1987 | Maier et al. .................... 30/374 |
| 5,012,583 | A | * | 5/1991 | Blochle et al. ................. 30/392 |
| D339,276 | S | * | 9/1993 | Matsuoka et al. ............... D8/64 |
| 5,680,704 | A | * | 10/1997 | Okubo et al. .................. 30/124 |
| D409,469 | S | * | 5/1999 | Niwa et al. ..................... D8/69 |
| D440,474 | S | * | 4/2001 | Heun ............................. D8/64 |
| 6,230,411 | B1 | * | 5/2001 | Wall et al. ...................... 30/376 |
| D474,384 | S | * | 5/2003 | Andriolo ....................... D8/64 |
| D523,311 | S | * | 6/2006 | Welsh et al. .................... D8/64 |
| 7,296,356 | B2 | * | 11/2007 | Ngan et al. .................... 30/376 |
| 7,356,930 | B2 | * | 4/2008 | Wadge et al. ............... 30/123.3 |
| 2007/0169606 | A1 | * | 7/2007 | Bone ............................. 83/835 |

FOREIGN PATENT DOCUMENTS

| DE | 3820752 A1 | * | 12/1989 |
| EP | 1834723 A1 | * | 9/2007 |
| GB | 2399315 A | * | 9/2004 |

* cited by examiner

*Primary Examiner*—Hwei-Siu C Payer
(74) *Attorney, Agent, or Firm*—Michael Aronoff; Adan Ayala

(57) ABSTRACT

A jigsaw comprising a debris or dust collection system is described. A shroud is arranged to encapsulate a portion of a saw blade such that debris from the blade ejected during cutting of a work-piece is captured in the shroud and entrained in an airflow provided by a vacuum source. The airflow passes along a pipe section from the shroud to the vacuum source, where the debris can be collected. The shroud is generally U-shaped and symmetrical such that it extends around other jigsaw components, such as the orbital action bell crank. As a result, the pipe can be fitted on either side of the jigsaw's shoe or footplate and engage with the shroud. The airflow in the immediate area of the cutting blade is transverse to the cut direction, thereby removing debris from the line-of-sight of the operator. The shroud is arranged such that only a portion of the blade passes through a volume defined by the shroud, footplate and work-piece. Thus, debris does not become entrained in other working parts of the tool, such as the reciprocating shaft or blade clamp.

13 Claims, 5 Drawing Sheets

DEBRIS REMOVAL APPARATUS FOR A JIGSAW

FIELD OF THE INVENTION

The present invention relates to a reciprocating saw, such as a jigsaw, which comprises a means for removing debris from the cut area.

The present invention is described below with reference to jigsaws. However, the present invention is not limited to jigsaws and can be applied to other types of machinery where removal of debris from an area of a work-piece being cut by the machine is required.

BACKGROUND OF THE INVENTION

Jigsaws are a well known type of reciprocating saw. The jigsaw typically comprises an electric motor which drives a reciprocating shaft via a gearbox. The shaft comprises a blade clamp disposed at one end thereof into which a cutting or sawing blade can be disposed. The blade held by the clamp extends through an aperture in a base plate. During use, the base plate is placed on a work-piece such that the saw blade engages an edge of the work-piece. Activation of the motor causes the blade to reciprocate and the application of a forward directed force by a user causes the blade to start cutting the work-piece.

The saw blades are typically arranged such that their cutting stroke occurs during the upward motion of the blade towards the jigsaw's body. As a result, debris produced by the cutting action of the blade can be thrown onto the work-piece during operation of the saw. The debris can obscure markings made on the work-piece by the user prior to cutting the work-piece, for guiding the cut. Thus, the user might have to manually blow or brush debris away from the cut area in order to keep sight of the markings during operation.

The use of an airflow generated by the jigsaw to remove debris from the work-piece is known. Many schemes use airflow generated by a fan disposed on the electric motor. The air is primarily used to cool the motor or gearbox but it can then be directed by conduits formed in the jigsaw's body to an exhaust port where the air flows towards the area of the work-piece being cut. Debris entrained in the airflow is removed from the immediate area of the work-piece being cut, thereby keeping that area largely free of obscuring debris.

It has been found to be advantageous to blow the debris away from the cut area in a direction which does not cause the debris to be moved into an area in front of the jigsaw and still on the cut line. For instance, EP 1601487 describes an arrangement where the air is directed across the cut direction of the jigsaw.

A dust shroud system is described in EP 0347631 which comprises a hood arranged to cover the entire front portion of a jigsaw, including the saw blade, blade clamp and reciprocating shaft.

BRIEF SUMMARY OF THE INVENTION

In a preferred embodiment, the present invention provdes a simple and robust apparatus for efficient removal of debris from the area of a work-piece being cut by a jigsaw. Furthermore, in a preferred embodiment, the present invention provides a debris collection apparatus which reduces or minimises the amount of debris ejected from the cut area and which might become trapped in working parts of the jigsaw thereby causing wear on moving components of the jigsaw.

More specifically, a preferred embodiment of the present invention provides an electrically operated hand-held cutting tool comprising a housing in which is disposed an electric motor for driving the tool, said motor having an output coupled to a reciprocating shaft, said shaft comprising a clamp disposed at an end of the shaft for holding a saw blade, wherein, during use, a saw blade disposed in the clamp extends through an aperture formed in a footplate arranged to engage with a work-piece, said tool further comprising a suction conduit arranged to remove a portion of debris ejected from a saw blade during a cutting operation, wherein the suction conduit further comprises a shroud arranged to engage with the footplate and cover a portion of the aperture, said shroud comprising a slot through which a blade can pass.

Thus, debris ejected from the work-piece is prevented from being thrown forward of the jigsaw in the cut direction by the shroud. Furthermore, the portion of the blade that enters a volume within which the debris is collected can be minimised to improve efficiency of debris collection and removal from the working area.

Preferably, the shroud and conduit are separable. Thus, these components can easily be removed from the tool for cleaning, for example.

Preferably, the conduit is arranged to be coupled to a low pressure source thereby providing a means to suck the debris away from the cut area of the work-piece and further improve the operator's visibility of the work-piece being cut.

Preferably, the shroud can be disposed on the footplate and the footplate is disposable on a work-piece, thereby defining a volume encapsulated by the shroud, footplate and work-piece, such that a portion of a saw blade having cutting teeth thereon enters the volume through the slot.

Preferably, the blade clamp and/or reciprocating shaft are excluded from, or do not enter the volume. Thus, the volume is kept relatively small such that, when the conduit is coupled to a vacuum cleaner (for instance), the airflow through the volume removes the debris with relatively greater efficiency than known systems.

Preferably, the volume comprises an airflow input and output, said airflow output being coupled to either, a pressure source lower than ambient pressure, or the conduit thereby providing a means to efficiently remove debris from the cut area. Where the low pressure source comprises a vacuum cleaner a portion of the debris ejected during cutting can be collected to assist with keeping the vicinity of the work area clean and relatively free of unwanted dust.

Preferably, the shroud is arranged to define a volume such that, during use, air passes across an area of the work-piece being cut by a blade in a direction transverse to the direction of cut. Thus, air passing in front of the blade (into which debris can become entrained) is generally in one direction with little or no turbulence. As a result, dust is cleared relatively quickly from an area immediately in front of the blade.

Preferably, the conduit can be coupled to the airflow output thereby driving area through the volume when the conduit is coupled to a blowing or suction device.

Preferably, the conduit detachably engages with the footplate. Thus, conduit can be removed from the footplate if it is not needed by the operator, or for cleaning.

Preferably, the airflow input and output respectively extend along either side of a saw blade disposed in the clamp. Thus, the shroud is generally U-shaped with the blade passing through the bottom portion of the U. As a result, the airflow through the shroud is relatively laminar, although there may be some turbulence in the airflow.

Preferably, the conduit is detachably engaged with a bridge component of the footplate arranged to couple the footplate to the housing. This provides a convenient anchor point for attaching the conduit to the tool.

Preferably, the footplate is moveable between a straight position and an angled position with respect to the housing to facilitate bevel cutting, and the conduit can be disposed on the footplate in a first or second position on either side of a central axis, such that, when the footplate is in the straight position, the conduit can be disposed in either the first or second positions. As a result, the operator can chose where the conduit is disposed to best suit their job at hand. For instance, the conduit might provide and obstacle if a cut is to be performed close to a wall. Thus, switching the conduit over to the over side of the tool can overcome this obstacle.

Preferably, when the footplate is in the angled position, the conduit can be disposed in the first position only. Thus, the conduit can be arranged on a side of the tool during bevel cutting which does not obstruct the space between the tool housing and footplate.

Preferably, the shroud is transparent thereby allowing the operator to view the cut area during use.

BRIEF DESCRIPTION OF THE INVENTION

An embodiment of the present invention is now described by way of example with reference to the accompanying drawings, of which:

DETAILED DESCRIPTION OF INVENTION

Figure 1:
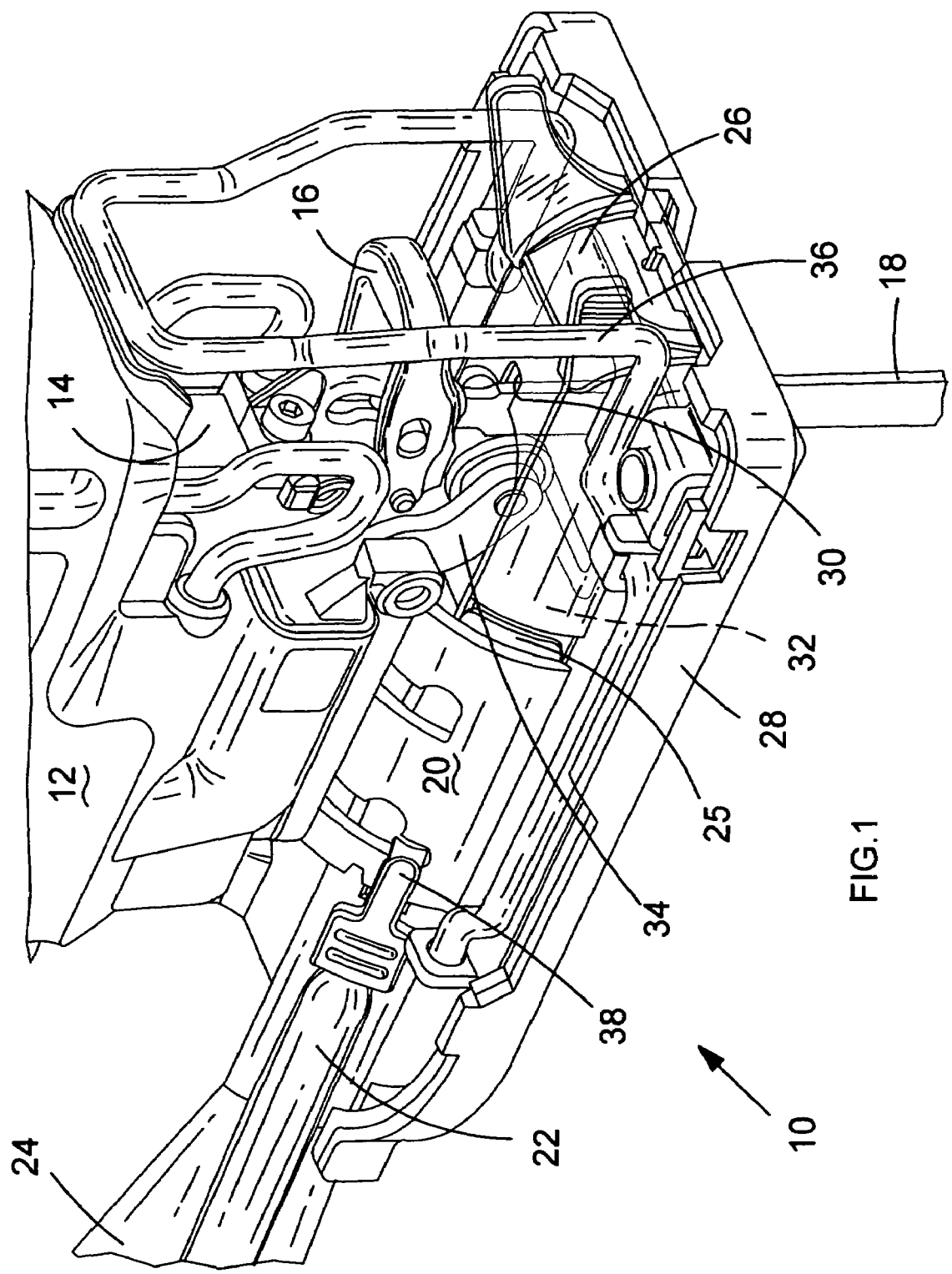
FIG. 1 is a schematic diagram of a portion of a jigsaw embodying the present invention.

Referring to FIG. 1, a jigsaw 10 embodying the present invention is shown. The jigsaw comprises a body 12 in which a motor and gearbox (not shown) are disposed. A reciprocating shaft 14 extends from a gearbox housing and comprises a clamp 16 at one end into which a saw blade 18 can be disposed and securely held. The saw blade extends through an aperture in a footplate 28 which is arranged to be placed on, and engage with a work-piece during use.

The footplate is coupled to the housing 12 or the gearbox housing via a bridge member 20. The bridge member has an arc-shaped profile such that the footplate can be angled with respect to the housing thereby allowing bevel cuts to be made, as is common in jigsaws.

A conduit or pipe 22 is detachably engaged to the shoe. In the embodiment shown, the pipe engages with a portion of the bridge component 20 such that the pipe passes through a space between the bridge and the footplate 28. The pipe has a large diameter end 24 and a relatively small cross-sectional area end 25. The large diameter end is arranged to be coupled to a vacuum cleaner of source of low pressure (compared to the ambient room pressure) so that, during use, air is drawn along the pipe from the small diameter end to the large diameter end. In accordance with known fluid dynamic principles, the speed of airflow at the small diameter end exceeds the airflow's speed at the large diameter end.

The smaller diameter end 25 of the pipe 22 is coupled to a shroud 26. The shroud is generally U-shaped and defines a volume into which a portion of the saw blade enters through a slot 30 formed in the shroud. The blade is free to reciprocate during use through the slot. Thus, during use a large proportion of debris ejected from the work-piece being cut by the saw blade, particularly during an upwards cutting stroke of the blade, enters a volume defined by the walls of the shroud, the footplate and the upper surface of the work-piece being cut.

The volume defined by the shroud has two openings 32, 32' to which the pipe 22 can be attached; the pipe is attachable to either opening. When an operating vacuum source is attached to the pipe, air flows through the volume from one opening (not having the pipe attached) across the front of the saw blade in a direction perpendicular to the cut direction of the blade and out of the volume through the opening to which the pipe is attached. A large proportion of debris ejected by the saw into the volume becomes entrained in the airflow and is removed from the immediate vicinity of the saw blade/work-piece engagement area by the moving air.

The air flow is predominately laminar through the volume, although there will be turbulent flow areas, typically around the saw blade. Furthermore, the cross-sectional area of the volume within the shroud is greater at the base of the U-shaped shroud in the vicinity of the blade than the cross-sectional area of the volume at either opening end of the shroud. Thus, the airflow accelerates as it is drawn away from the immediate area of the base of the shroud, closest to the blade. In this way, the efficiency with which debris is removed from the cutting area of the work-piece can be improved.

The shroud can be securely disposed on the footplate such that it generally wraps around the blade and an orbital-action mechanism 34 such as a bell crank. As a result, it is possible to minimise debris escaping the shroud and entering mechanisms where it might contribute to the wear of components over a length of time.

Conveniently, the shroud can be arranged to be removably disposed on the footplate between the bridge component 20 and a safety guard 36. Thus, the shroud does not hinder the normal operational characteristics of the jigsaw. Likewise, the pipe 22 can be removaby disposed on the footplate. A latch mechanism 38 can be used to secure the pipe in position, where the latch is resiliently urged into engagement with a cooperating component of the bridge.

Figure 2:
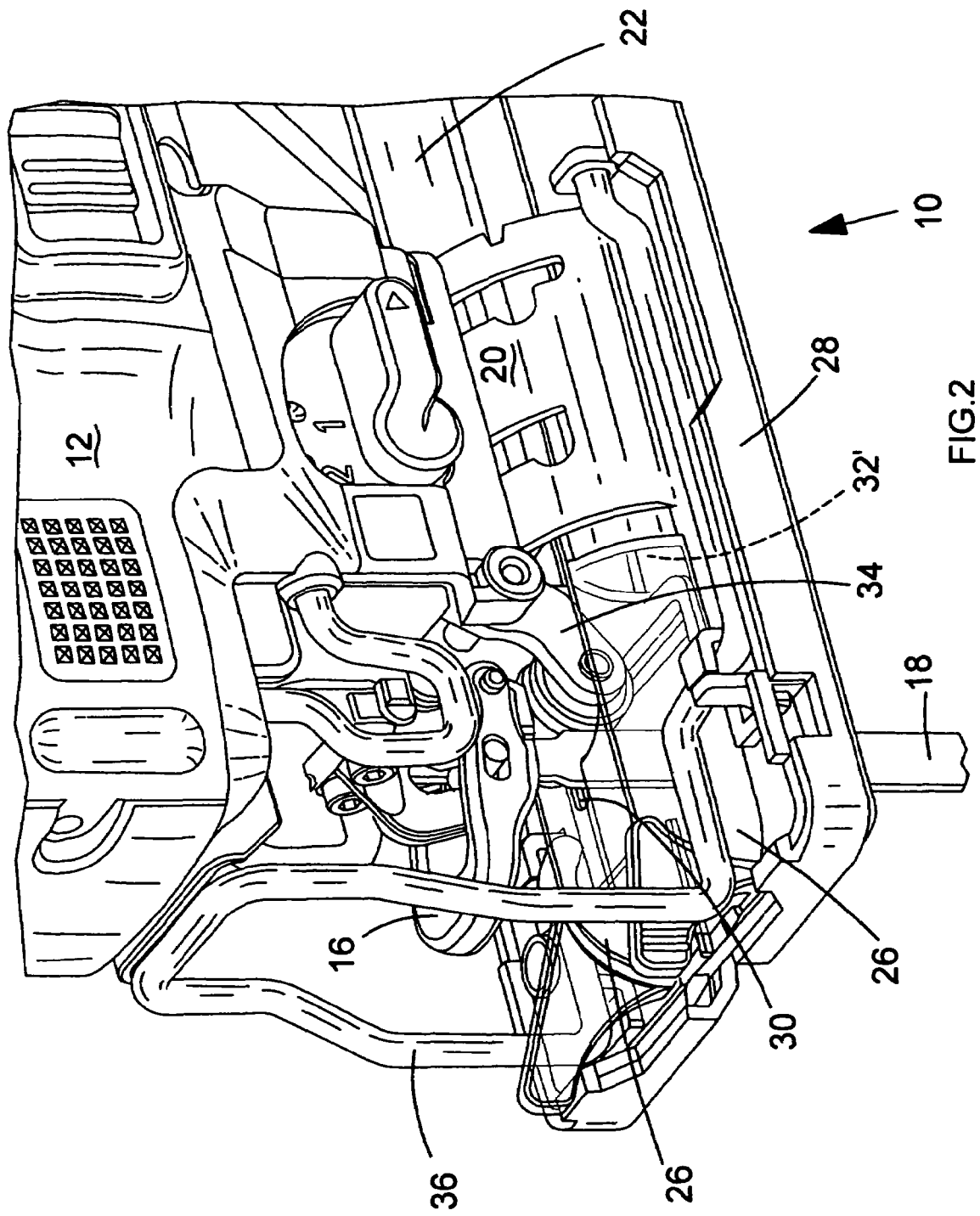
FIG. 2 is a schematic diagram of the jigsaw shown in FIG. 1, viewed from a different angle.

Referring to FIG. 2, the system shown in FIG. 1 is further shown from a different angle. From this viewpoint the other opening 32' of the shroud can be seen. The pipe is not connected to this opening 32'. However, the shroud is arranged to be symmetrical such that the opening 32' is disposed in a position close to the bridge component 20. Thus, it is possible to position the pipe such that it engages with the opening 32'. In this situation, the airflow through the shroud when a vacuum source is coupled to the pipe is in the opposite direction to the arrangement described above, of course.

Figure 3:
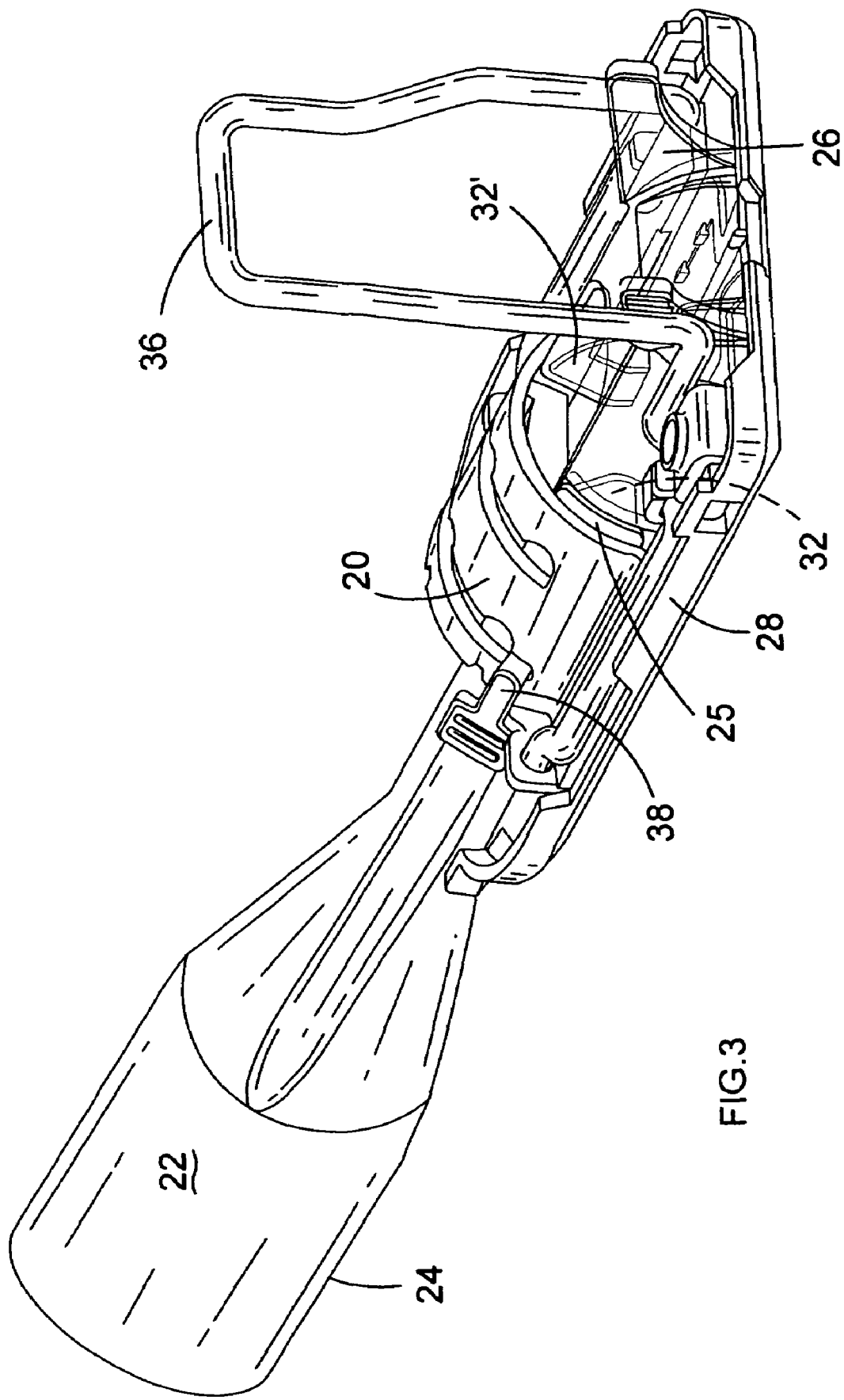
FIG. 3 is a schematic diagram showing components of the jigsaw in FIG. 1.

Referring now to FIG. 3, the arrangement shown in FIG. 1 is shown again, however, some components of the jigsaw are not shown for clarity. This figure does not show the jigsaw body, gearbox housing, blade clamp or saw blade, for instance. Both openings 32 and 32' of the shroud 26 are arranged to extend into a position close to the bridge component 20, as described above. Likewise, the pipe is arranged to be properly located such that the small diameter end 25 engages with or is coupled to an opening of the shroud. Because of the shroud's symmetry, the pipe can be arranged to couple to either opening 32 or 32'. As a result the operator is able to choose on which side of the jigsaw the pipe is to be placed so as to cause least disruption or obstruction during use. The efficiency of debris removal from the cut area is not dependent on the location of the pipe.

The pipe comprises a resilient member 38 arranged to cooperate with a portion of the bridge member 20. The resilient member is arranged to positively engage with this portion of the bridge to ensure proper location of the pipe on the footplate. Furthermore, the operator is able to see that the pipe is properly located when the resilient member has engaged with the portion of the bridge component.

Figure 4:
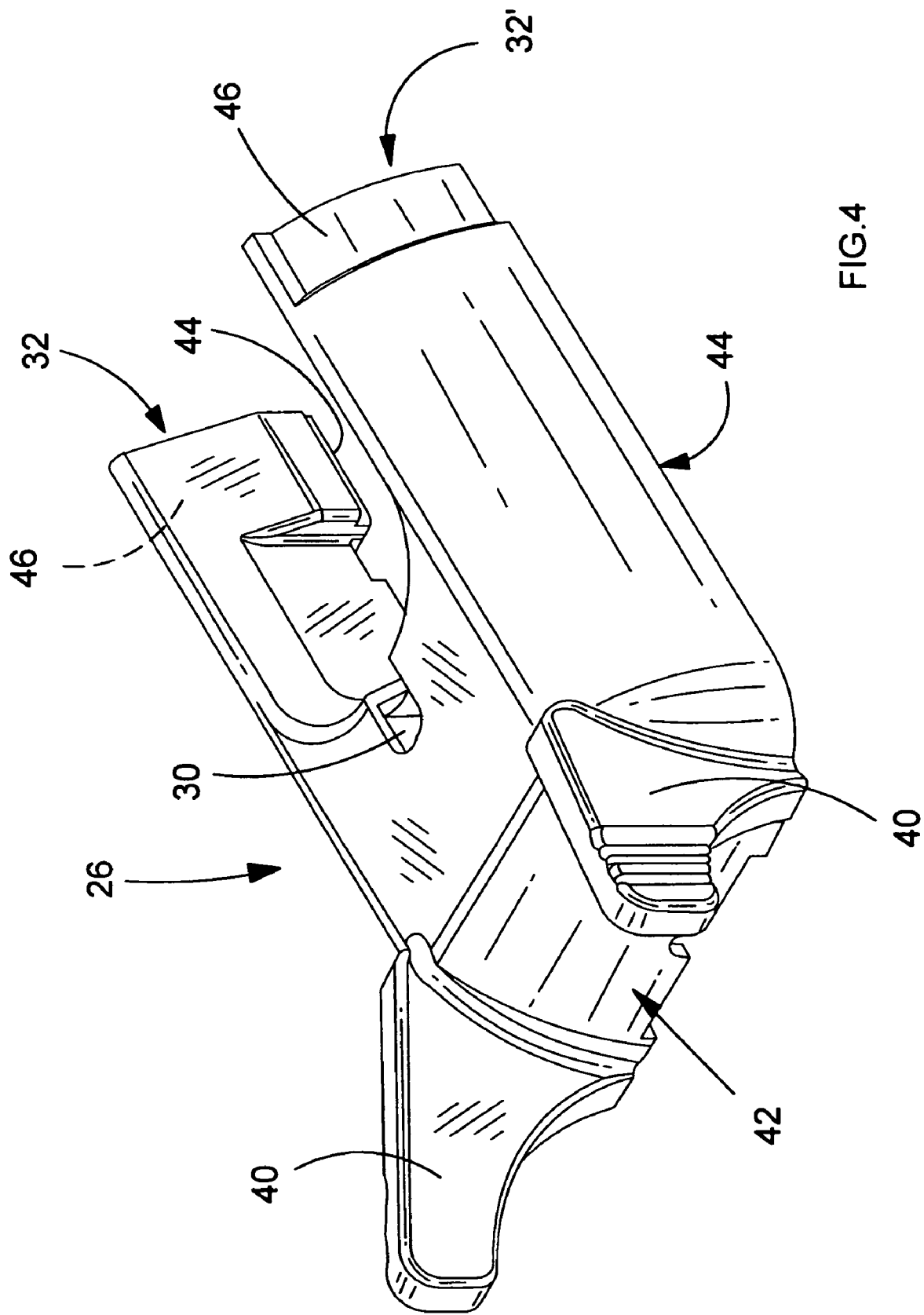
FIG. 4 is a schematic diagram of a debris collection shroud embodying the present invention.
Figure 5:
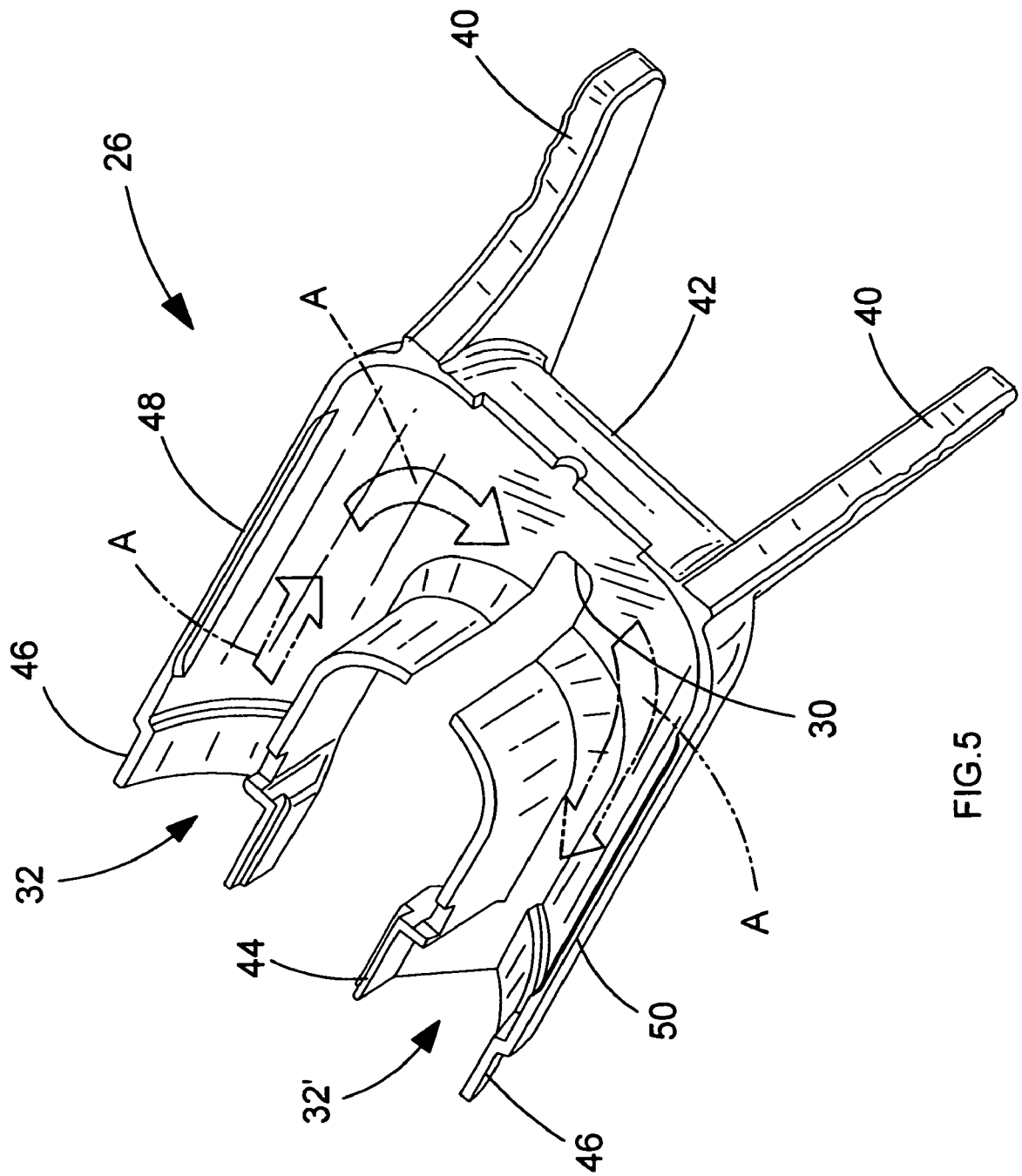
FIG. 5 is a schematic diagram of the shroud shown in FIG. 4 viewed from a different angle.

Referring now to FIGS. 4 and 5, a shroud embodying the present invention is shown. FIG. 4 shows the top side of the shroud and FIG. 5 shows the shroud's underside. The shroud comprises tangs 40 extending from a front portion 42 of the shroud. These tangs provide a convenient means by which the shroud can be manually placed on or removed from the jigsaw footplate.

The underside edge 44 of the shroud is arranged to locate with cooperating components formed on the jigsaw footplate or shoe to secure the shroud in position during normal usage.

Furthermore, each opening 32 or 32' of the shroud comprises a depressed portion 46 arranged to cooperate with a tang formed on the pipe to assist with locating the pipe and the shoe for proper use thereof.

Referring to FIG. 5, the underside of the shroud is shown. Arrows A indicate the direction of airflow when the pipe and vacuum source are attached to opening 32', and when the shroud is disposed on a jigsaw footplate which in turn is disposed on a work-piece. Generally speaking, the airflow is along one arm 48 of the U-shaped shroud, across the front portion 42 of the shroud and down the other arm 50 to the opening 32' and thence along the pipe and eventually to the source of the vacuum.

The shroud is made from a transparent plastic material to enable the operator to view the area of the work-piece being cut. Acrylic or other similar material might be suitable.

What is claimed is:

1. An electrically operated hand-held cutting tool comprising:
    a housing in which an electric motor is disposed for driving the tool, said motor having an output coupled to a reciprocating shaft;
    a clamp disposed at an end of the shaft;
    a saw blade disposed in the clamp;
    a footplate having an aperture and arranged to engage with a work-piece; and
    a conduit arranged for removal of a portion of debris ejected from the saw blade during a cutting operation,
    a shroud having a slot through which a portion of the saw blade can pass and arrange to cover a portion of the aperture, the shroud disposed on the footplate, and
    wherein upon disposing the footplate on a work-piece the shroud, the footplate and the work-piece define a volume arranged such that a portion of the saw blade having a plurality of cutting teeth enters the volume through the slot, and the clamp is excluded from the volume.

2. The tool of claim 1, wherein the shroud and the conduit are separable.

3. The tool of claim 1, wherein the conduit is arranged to be coupled to a low pressure source.

4. The tool of claim 1, wherein the conduit detachably engages with the footplate.

5. The tool of claim 1, wherein the conduit is detachably engaged with a bridge component of the footplate and wherein the bridge component couples the footplate to the housing.

6. The tool of claim 5, wherein the footplate is moveable between a straight position and an angled position with respect to the housing to facilitate bevel cutting, and the conduit can be disposed on the footplate in a first or second position on either side of a central axis, such that, when the footplate is in the straight position, the conduit can be disposed in either the first or second positions.

7. The tool of claim 6, wherein when the footplate is in the angled position, the conduit can be disposed in only one of the first position and second position.

8. The tool of claim 1, wherein the shroud is transparent.

9. An electrically operated hand-held cutting tool comprising:
    a housing in which an electric motor is disposed for driving the tool, said motor having an output coupled to a reciprocating shaft;
    a clamp disposed at an end of the shaft;
    a saw blade disposed in the clamp;
    a footplate having an aperture and arranged to engage with a work-piece; and
    a conduit arranged for removal of a portion of debris ejected from the saw blade during a cutting operation,
    a shroud having a slot through which a portion of the saw blade can pass and arranged to cover a portion of the aperature, the shroud disposed on the footplate, and
    wherein upon disposing the footplate on a work-piece the shroud, the footplate and the work-piece define a volume arranged such that a portion of the saw blade having a plurality of cutting teeth enters the volume through the slot, and the reciprocating shaft is excluded from the volume.

10. An electrically operated hand-held cutting tool comprising:
    a housing in which an electric motor is disposed for driving the tool, said motor having an output coupled to a reciprocating shaft;
    a clamp disposed at an end of the shaft;
    a saw blade disposed in the clamp;
    a footplate having an aperture and arranged to engage with a work-piece; and
    a conduit arranged for removal of a portion of debris ejected from the saw blade during a cutting operation,
    a shroud having a slot through which a portion of the saw blade can pass and arrange to cover a portion of the aperture, the shroud disposed on the footplate, and
    wherein upon disposing the footplate on a work-piece the shroud, the footplate and the work-piece define a volume arranged such that a portion of the saw blade having a plurality of cutting teeth enters the volume through the slot, and the shroud comprises an airflow input and output, the airflow output being coupled to either a pressure source lower than ambient pressure or the conduit.

11. The tool of claim 10, wherein the shroud is arranged to define a volume such that, during use, air passes across an area of the work-piece being cut by the cutting tool in a direction transverse to the direction of cut.

12. The tool of claim 10, wherein the conduit can be coupled to the airflow input.

13. The tool of claim 10, wherein the airflow input and output respectively extend along either side of the saw blade disposed in the clamp.

* * * * *